United States Patent

Bonelli

[11] Patent Number: 5,617,644
[45] Date of Patent: Apr. 8, 1997

[54] CIGAR MEASURING DEVICE

[76] Inventor: Dennis Bonelli, 1071 W. Chestnut St., Union, N.J. 07083

[21] Appl. No.: 451,523

[22] Filed: May 26, 1995

[51] Int. Cl.$^6$ ............ G01B 121/00; G01B 3/34; G01B 3/06
[52] U.S. Cl. .................................. 33/548; 33/555.2
[58] Field of Search .................. 33/548, 555.2, 33/483, 492, 493, 494, 809, 555.1, 563, 565

[56] References Cited

U.S. PATENT DOCUMENTS

| | | | |
|---|---|---|---|
| 66,120 | 6/1867 | Bigelow | 33/494 |
| 85,553 | 1/1869 | Adams | 33/555.2 |
| D. 168,694 | 1/1953 | Langer | 33/494 |
| 308,115 | 11/1884 | Watteyne | 33/548 |
| 334,457 | 1/1886 | McCann | 33/494 |
| 435,073 | 8/1890 | Messina et al. | 33/548 |
| 524,589 | 8/1894 | Gruebel | 33/555.2 |
| 861,443 | 7/1907 | Eckard | 33/555.2 |
| 987,703 | 3/1911 | Curtin | 33/562 |
| 1,372,691 | 3/1921 | Herrman | 33/494 |
| 1,438,681 | 12/1922 | Bath | 33/555.2 |
| 1,524,474 | 1/1925 | Buck | 33/562 |
| 1,881,651 | 10/1932 | Judge | 33/555.2 |
| 2,945,301 | 7/1960 | Peterson | 33/1 |
| 3,381,385 | 5/1968 | Wilber | 33/563 |
| 3,858,325 | 1/1975 | Goerler | 33/199 |
| 4,517,747 | 5/1985 | Morin | 33/178 |
| 5,251,642 | 10/1993 | Handlos | 33/555.2 |
| 5,353,513 | 10/1994 | Round | 33/555.2 |

OTHER PUBLICATIONS

A. Bati, The Cigar Companion, pp. 44–47 (Running Press: Philadelphia, PA, 1993) no month.

Primary Examiner—Thomas B. Will
Attorney, Agent, or Firm—Claire Ann Koegler

[57] ABSTRACT

An apparatus and method are disclosed for determining the length and diameter, or ring size, of a cigar. This information, together with the manufacturer's name, permits the user to determine the size and hence the name of a particular cigar in order to facilitate the purchase of same. The apparatus disclosed may be compact and pocket-sized.

20 Claims, 6 Drawing Sheets

CIGAR MEASURING DEVICE

BACKGROUND OF THE INVENTION

Cigar smoking has been known for centuries. Quality cigars are hand-made and produced to certain predetermined standards. Machine-made cigars are also produced to certain predetermined standards. These standards include the length of the cigar, which may range from about four (4) inches to nine and one-quarter (9¼) inches, but is usually between four and one-half (4½) inches and eight (8) inches, and the girth or diameter of the cigar, which may range from about three-eighths (⅜) inch to slightly more than one (1) inch. The diameter is typically measured in sixty-fourths (¹⁄₆₄) of an inch, with the number of sixty-fourths being designated as the ring size. Thus, a cigar having a diameter of forty-nine sixty-fourths (⁴⁹⁄₆₄) of an inch would have a ring size of 49.

According to A. Bari, *The Cigar Companion* (Running Press: Philadelphia, Pa., 1993), at pages 44–47, there are no fewer than sixty (60) possible cigar sizes. Some Havana brands have as many as forty (40) different sizes, while most non-Havana brands have six (6) to 10 (10) sizes, according to the same source.

While many manufacturers use similar standard sizes for their cigars, they typically assign their own proprietary names for the various sizes of the cigars they make. These proprietary names, however, do not typically appear on the paper band or ring on the cigar itself. Rather, the paper band typically contains only the manufacturer's name. Table 1 lists examples of sizes and names of various cigars according to *The Cigar Companion*.

Each manufacturer has its own blend, and each manufacturer generally uses a different blend of tobaccos in each of the sizes of cigars it makes in its product line.

Thus, a cigar smoker who has enjoyed a particular cigar cannot use the manufacturer's name on the paper band to determine the name or size of the particular cigar. Accordingly, such a cigar smoker has no way to purchase the same cigar.

TABLE 1

| Length | Ring Gauge | Name(s) |
| --- | --- | --- |
| 9¼ | 47 | Gran Corona, Montecristo A |
| 7⅞ | 49 | Double Corona |
| 7½ | 38 | Especial |
| 7 | 47 | Churchill |
| 7 | 36 | Long Pantela |
| 6½ | 42 | Lonsdale |
| 6⅛ | 52 | Pyramids, Torpedo |
| 6 | 42 | Corona Grande |
| 5¾ | 39 | Culebras |
| 5⅝ | 46 | Corona Gorda |
| 5½ | 52 | Belicoso |
| 5½ | 42 | Corona |
| 5 | 50 | Robusto, Rothschild |
| 5 | 48 | Hermoso |
| 5 | 42 | Petit Corona |
| 4½ | 40 | Tres Petit Corona |
| 4½ | 26 | Panatela |
| 4 | 40 | Perla |
| 4 | 30 | Demi Tasse |

SUMMARY OF THE INVENTION

One object of the invention is to permit a user to determine the length and diameter, or ring size, of a cigar. A further object of the invention is to permit a user to determine the size, and hence name, of a particular cigar within a manufacturer's product line.

A further object of the invention is to provide such a cigar measuring device in a compact and pocket-sized form.

DETAILED DESCRIPTION OF THE INVENTION

Figure 1A:
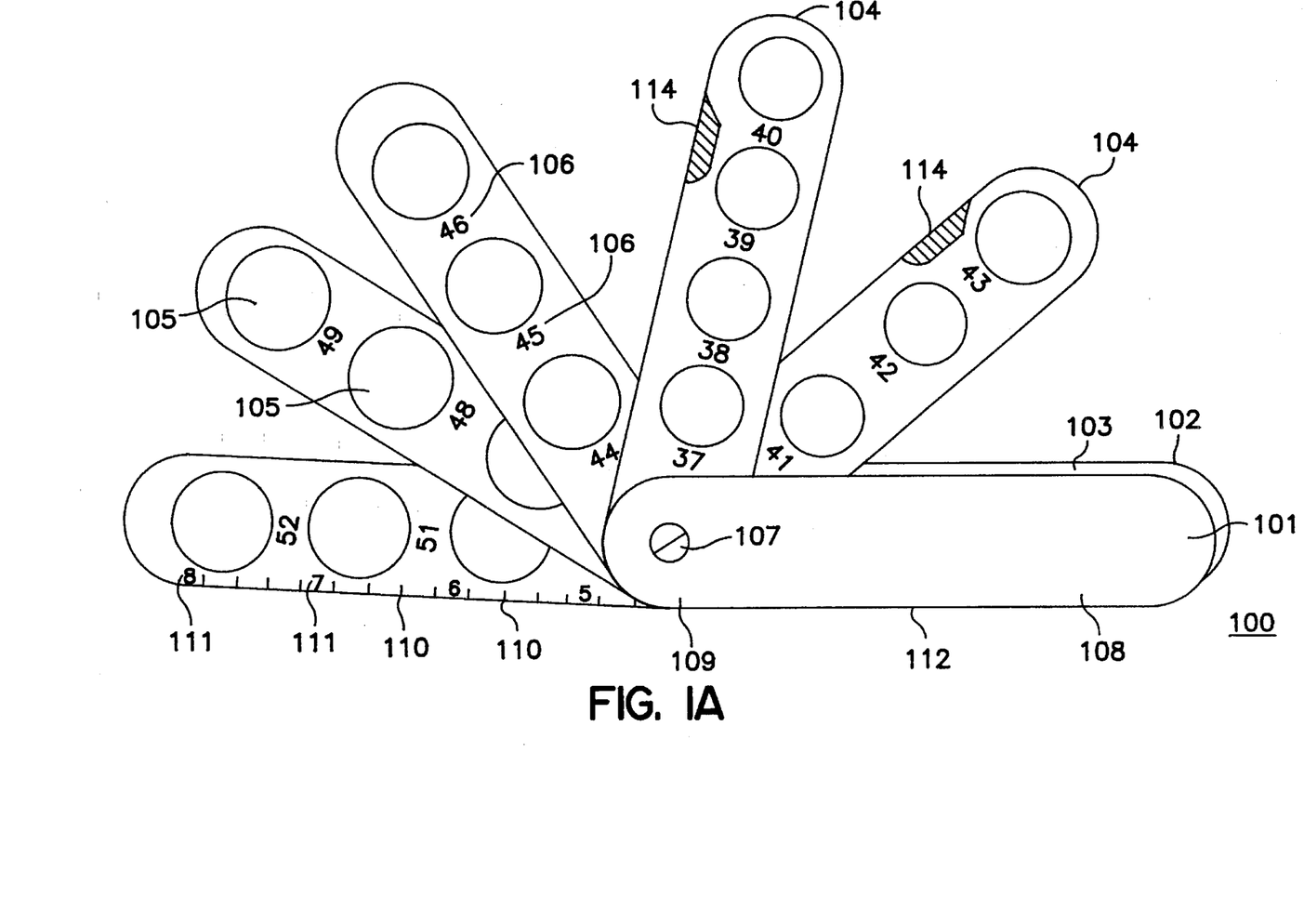
FIGS. 1A–1C show a cigar measuring device in accordance with one embodiment of the present invention.
Figure 1B:
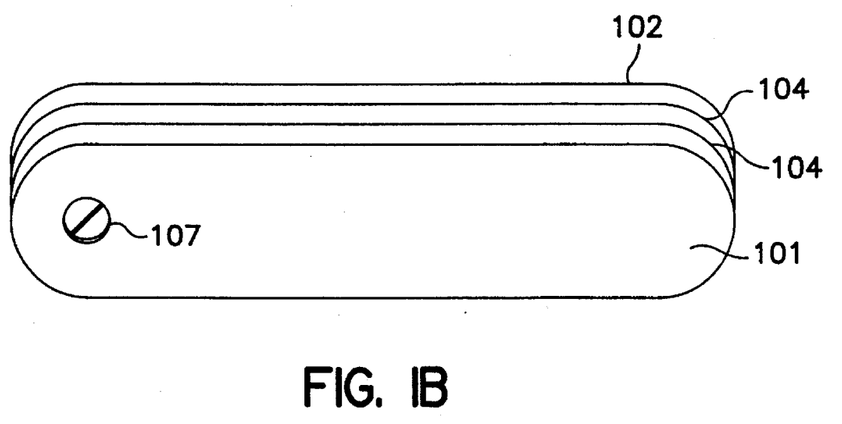
Figure 1C:
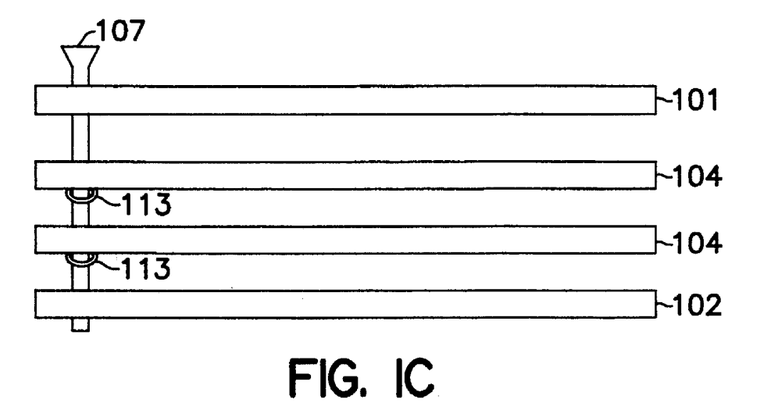

FIGS. 1A–1C show a cigar measuring device 100 in accordance with a first embodiment of the present invention. The device 100 includes an outer case having a front portion 101 and a back portion 102. The outer case may be made from a variety of materials, including, but not limited to, brass, steel, aluminum, titanium, anodized aluminum, stainless steel, sterling silver, nickel silver, gold plated metal, plastic, exotic hardwoods, mahogany, ebony, cherry, leather, reinforced leather, and the like. The outer case is preferably made from a rigid material, such as metal, plastic, wood, and the like. The outer case is shaped so as to include a gap 103 between the front portion 101 and back portion 102 along the top portion thereof, while the bottom portion 112 is preferably closed. The outer case may be of unitary construction or the front and back portions may be joined at the bottom portion and/or at one end thereof and/or optionally by a fastening means 107, such as a screw, rivet, or the like.

The device 100 further includes plural leaves 104, rotatably mounted on a fastening means 107. The fastening means 107 has an axis of rotation perpendicular to the front portion 101 of the outer case. The plural leaves are preferably made from a rigid material, such as metal, wood, plastic, and the like. The plural leaves 104 are designed so as to fit within the gap in the outer case in a stored position as shown in FIG. 1B. The fastening means may include known tension means 113 in FIG. 1C (exploded view) to maintain the leaves 104 in the stored position. The plural leaves 104 may optionally be provided with known detents 114 in FIG. 1A along the top portion thereof so as to facilitate rotating them out of the stored position.

Each of the plural leaves 104 is provided with at least one aperture 105 having a unique diameter. Each of the plural leaves 104 may be provided with indicia 106 adjacent each aperture 105, whereby each indicium 106 denotes the ring size, or diameter in units of one sixty-fourth (¹⁄₆₄) inch. The indicia 106 may be engraved, embossed, imprinted, or otherwise provided on the leaves 104. In a preferred embodiment, apertures 105 would be provided to correspond to each ring size from about thirty-eight (38) to about fifty-four (54). Alternately, apertures 105 could be provided corresponding only to even ring sizes or corresponding only to odd ring sizes, so as to decrease the number of leaves 104 required.

In actual construction, it is necessary that the apertures 105 be drilled approximately one sixty-fourth of an inch larger than the corresponding ring size. Thus, an aperture 105 corresponding to ring size 49, and bearing a "49" indicium 106, would have an actual diameter of approximately fifty sixty-fourths ($^{50}/_{64}$) of an inch.

The bottom portion 112 of the front portion 101 of the outer case is provided with a zero rule 108 and optionally with one or more ruled markings 109. At least one of the plural leaves 104 is further provided with ruled markings 110 along a portion thereof, such portion being the top portion in the stored position as shown in FIG. 1B and the bottom portion in the open position, as illustrated in FIG. 1A. Such ruled markings may be at 1-inch, ½-inch, ¼-inch, ⅛-inch, or, most preferably, ¹⁄₁₆-inch intervals. The at least one plural leaf 104 provided with ruled markings 110 is preferably further provided with indicia 111 adjacent at least one or more of the ruled markings 110, whereby each indicium indicates the length from the zero point 108 in units of one (1) inch. The indicia 111 may be engraved, embossed, imprinted, or otherwise provided on the at least one leaf 104. In a preferred embodiment, the ruled markings would extend from about four and one-half (4½) inches to about eight (8) inches.

To use the measuring device 100, a user would rotate the leaves 180° from the stored position so that the at least one leaf 104 having ruled markings 110 is aligned with the outer case, to create a straight rule from the zero point 108 through the ruled markings 110 as illustrated in FIG. 1. The user would then align one end of a cigar with the zero point 108 and determine the length of the cigar using the ruled markings 110. To determine the diameter or ring size of the cigar, the user then passes the cigar through the apertures 105 to determine the closest fit. The cigar should not be forced, as this will strip the outer leaves from the cigar.

With knowledge of the manufacturer, the length, and the ring size of the cigar, the user can enter any tobacco shop and request the particular cigar desired.

Figure 2:
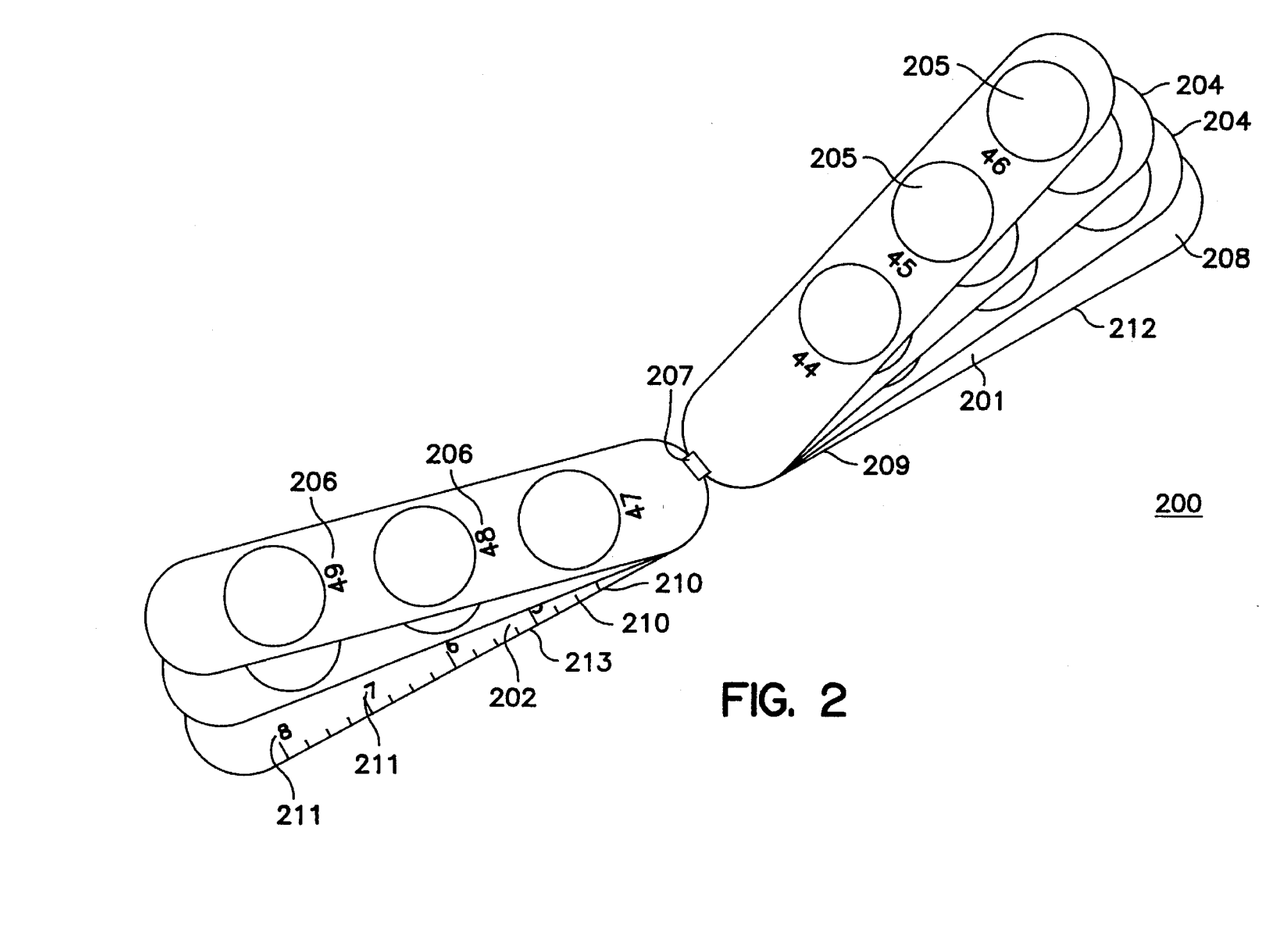
FIG. 2 shows a cigar measuring device in accordance with another embodiment of the present invention.

FIG. 2 shows a cigar measuring device 200 in accordance with another embodiment of the present invention. The device 200 includes an outer case having a front portion 201 and a back portion 202. The outer case may be made from a variety of materials, as described above with regard to the embodiment of FIG. 1, and preferably is made from a rigid material, as described above. As shown in FIG. 2, the front and back portions may be joined at one end thereof, optionally by a fastening means 207, such as a hinge or the like.

The device 200 further includes plural leaves 204, rotatably mounted on a fastening means 207. The fastening means 207 has an axis of rotation parallel to the front portion 201 of the outer case. The plural leaves are preferably made from a rigid material, such as metal, plastic, wood, and the like, as described with regard to the embodiment of FIG. 1.

Each of the plural leaves 204 is provided with at least one aperture 205 having a unique-diameter. Each of the plural leaves 204 may be provided with indicia 206 adjacent each aperture 205, whereby each indicium 206 denotes the ring size, or diameter in units of one sixty-fourth ($^{1}/_{64}$) inch. The indicia 206 may be engraved, embossed, imprinted, or otherwise provided on the leaves 204. In a preferred embodiment, apertures 205 would be provided to correspond to each ring size from about thirty-eight (38) to about fifty-four (54). Alternately, apertures 205 could be provided corresponding only to even ring sizes or corresponding only to odd ring sizes, so as to decrease the number of leaves 204 required.

Again, in actual construction, it is necessary that the apertures 205 be drilled approximately one sixty-fourth of an inch larger than the corresponding ring size. Thus, an aperture 205 corresponding to ring size 49, and bearing a "49" indicium 206, would have an actual diameter of approximately fifty sixty-fourths ($^{50}/_{64}$) of an inch.

The bottom portion 212 of the front portion 201 of the outer case is provided with a zero rule 208 and optionally with one or more ruled markings 209. The bottom portion 213 of the back portion 202 of the outer case is provided with ruled markings 210. Such ruled markings may be at 1-inch, ½-inch, ¼-inch, ⅛-inch, or, most preferably, ¹⁄₁₆-inch intervals. The bottom portion 213 of the back portion 202 of the outer case is preferably further provided with indicia 211 adjacent at least one or more of the ruled markings 210, whereby each indicium indicates the length from the zero point 208 in units of one (1) inch. The indicia 211 may be engraved, embossed, imprinted, or otherwise provided on the bottom portion 213 of the back portion 202 of the outer case. In a preferred embodiment, the ruled markings would extend from about four and one-half (4½) inches to about eight (8) inches.

To use the measuring device 200, a user would unfold the outer case and the leaves 204, so that the bottom portion 213 of the back portion 202 of the outer case is on a flat plane with the bottom portion 212 of the front portion 201 of the outer case. The user would then align one end of a cigar with the zero point 208 and determine the length of the cigar using the ruled markings 210. To determine the diameter or ring size of the cigar, the user then passes the cigar through the apertures 205 to determine the closest fit. As mentioned before, the cigar should not be forced, as this will strip the outer leaves from the cigar.

Again, with knowledge of the manufacturer, the length, and the ring size of the cigar, the user can enter any tobacco shop and request the particular cigar desired.

Figure 3A:
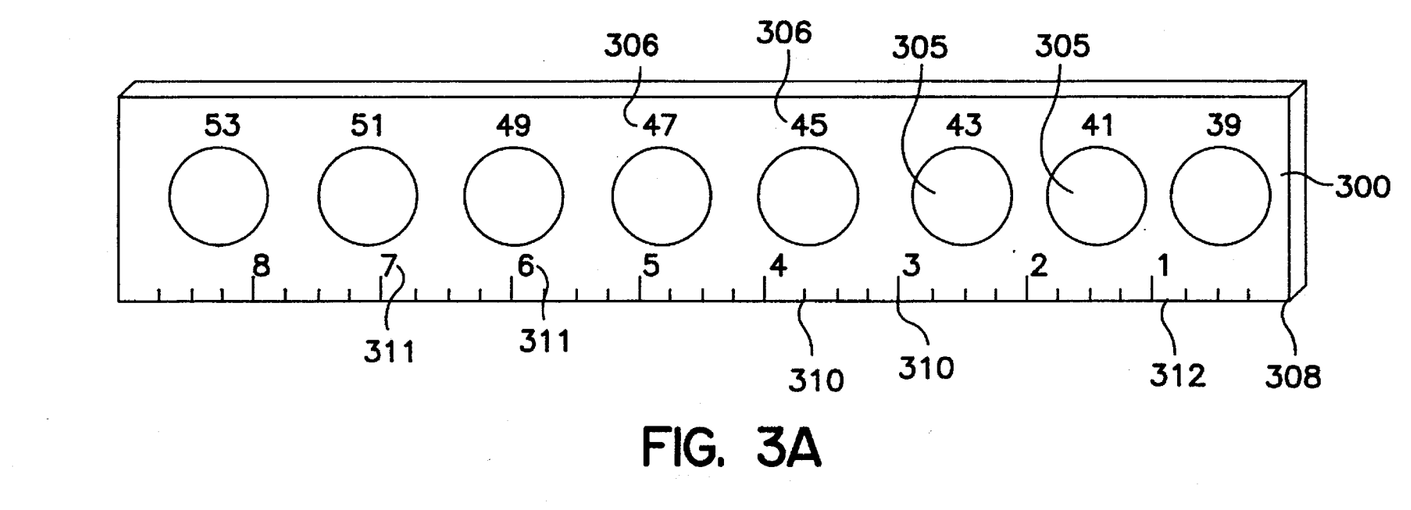
FIGS. 3A–3B show a cigar measuring device in accordance with yet another embodiment of the present invention.

FIG. 3A shows a cigar measuring device 300 in accordance with yet another embodiment of the present invention. The device 300 is of unitary construction and is preferably made from a rigid material, as described above with regard to the embodiment of FIG. 1.

The cigar measuring device 300 is provided with plural apertures 305, each of such apertures having a unique diameter. The device 300 may be provided with indicia 306 adjacent each aperture 305, whereby each indicium 306 denotes the ring size, or diameter in units of one sixty-fourth ($^{1}/_{64}$) inch. The indicia 306 may be engraved, embossed, imprinted, or otherwise provided on the device 300. In one embodiment, apertures 305 would be provided to correspond to each ring size from about thirty-eight (38) to about fifty-four (54). Alternately, apertures 305 could be provided corresponding only to even ring sizes or corresponding only to odd ring sizes, as shown in FIG. 3, so as to decrease the size of the device 300.

As before, in actual construction, it is necessary that the apertures 305 be drilled approximately one sixty-fourth of an inch larger than the corresponding ring size.

Figure 3B:
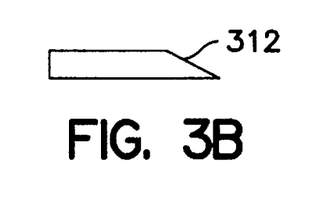

The bottom portion 312 of the measuring device 300 is provided with ruled markings 310. Such ruled markings may be at 1-inch, ½-inch, ¼-inch, ⅛-inch, or, most preferably, ¹⁄₁₆-inch intervals. One edge of the bottom portion 312 of the device 300 may be used as the zero rule 308, or a separate zero rule (not shown) may be provided. The bottom portion 312 of the device 300 is preferably further provided with indicia 311 adjacent at least one or more of the ruled markings 310, whereby each indicium indicates the length from the zero point 308 in units of one (1) inch. The indicia 311 may be engraved, embossed, imprinted, or otherwise provided on the bottom portion 312 of the device 300. In a preferred embodiment, the ruled markings would extend from about four and one-half (4½) inches to about eight (8) inches. The bottom portion 312 may optionally be bevelled, as shown in FIG. 3B.

To use the measuring device 300, a user would simply align one end of a cigar with the zero point 308 and determine the length of the cigar using the ruled markings 310. To determine the diameter or ring size of the cigar, the user then passes the cigar through the apertures 305 to determine the closest fit. Once again, the cigar should not be forced.

As before, with knowledge of the manufacturer, the length, and the ring size of the cigar, the user can enter any tobacco shop and request the particular cigar desired.

Figure 4:
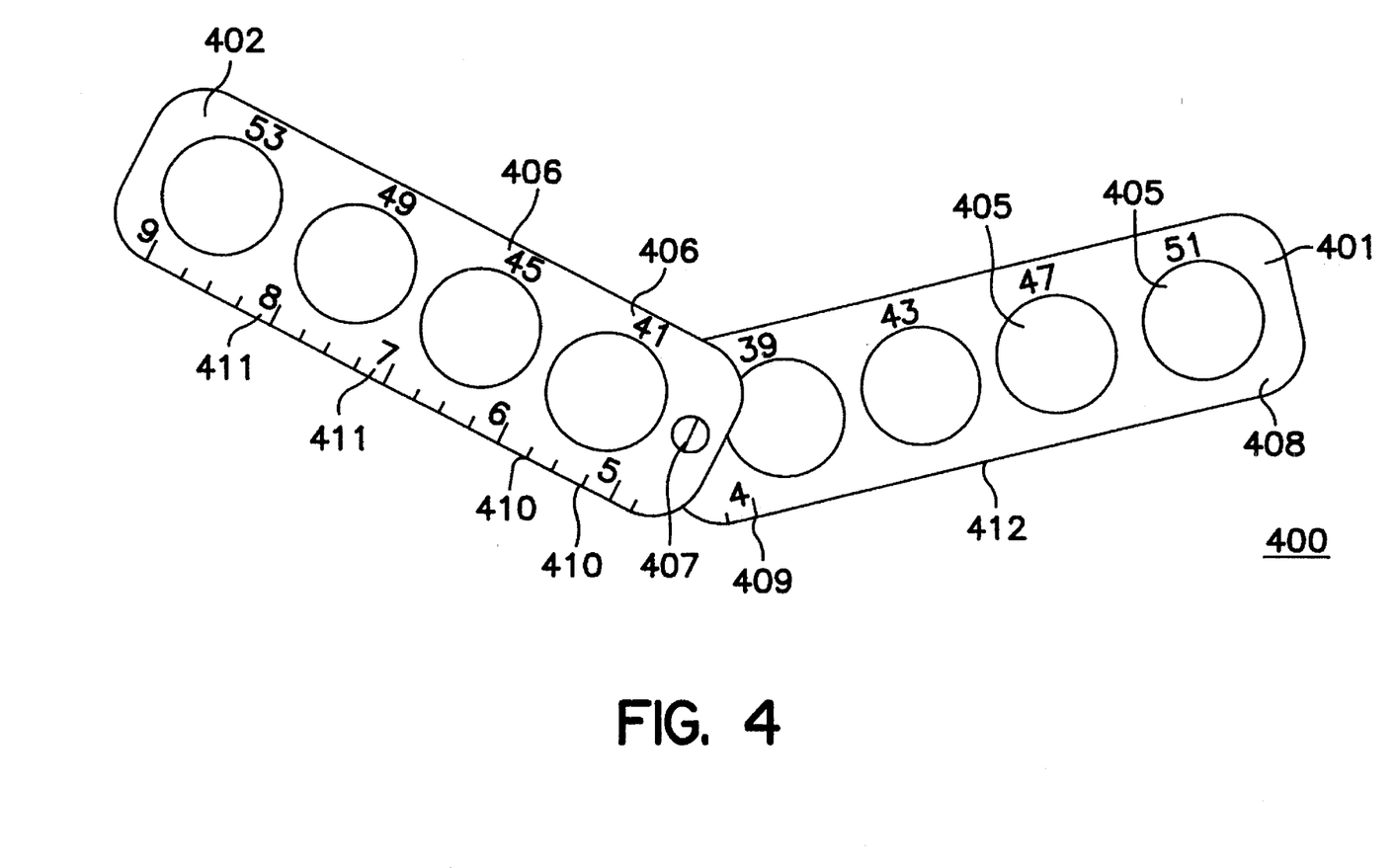
FIG. 4 shows a cigar measuring device in accordance with still another embodiment of the present invention.

FIG. 4 shows a cigar measuring device 400 in accordance with a still another embodiment of the present invention. The device 400 comprises a first blade 401 and a second blade 402, each blade preferably made from a rigid material, such as metal, wood, plastic, and the like, as described above. The two blades are rotatably joined at one end thereof by a fastening means 407, such as a screw, rivet, or the like, where the fastening means 407 has an axis of rotation perpendicular to the surface of the blades. The device 400 may comprise more than two blades, in which case a third blade would be rotatably joined to the second blade, and so forth.

Each of the blades is provided with plural apertures 405, each aperture 405 having a unique diameter. Each of the blades may be provided with indicia 406 adjacent each aperture 405, whereby each indicium 406 denotes the ring size, or diameter in units of one sixty-fourth (1/64) inch. The indicia 406 may be engraved, embossed, imprinted, or otherwise provided on the blades. In one embodiment, apertures 405 would be provided to correspond to each ring size from about thirty-eight (38) to about fifty-four (54). Alternately, apertures 405 could be provided corresponding only to even ring sizes or corresponding only to odd ring sizes, as shown in FIG. 4, so as to decrease the size of the device 400.

As before, the apertures 405 must be drilled approximately one sixty-fourth of an inch larger than the corresponding ring size.

The bottom portion 412 of the first blade 401 is provided with a zero rule 408 and optionally with one or more ruled markings 409. Alternatively, the edge of the first blade 401, if squared, may be used as the zero rule (not shown). The second blade 402 is further provided with ruled markings 410 along a portion thereof, such portion being the top portion in the stored position (not shown) and the bottom portion in the open position. As before, such ruled markings may be at 1-inch, ½-inch, ¼-inch, ⅛-inch, or, most preferably, 1/16-inch intervals. The second blade 402 is preferably further provided with indicia 411 adjacent at least one or more of the ruled markings 410, whereby each indicium indicates the length from the zero point 408 in units of one (1) inch. As before, the indicia 411 may be engraved, embossed, imprinted, or otherwise provided on the second blade 402. In a preferred embodiment, the ruled markings would extend from about four and one-half (4½) inches to about eight (8) inches.

To use the measuring device 400, a user would rotate the blades 180° from the stored position to create a straight rule from the zero point 408 through the ruled markings 410. The user would then align one end of a cigar with the zero point 408 and determine the length of the cigar using the ruled markings 410. To determine the diameter or ring size of the cigar, the user then passes the cigar through the apertures 405 to determine the closest fit. As before, with knowledge of the manufacturer, the length, and the ring size of the cigar, the user can enter any tobacco shop and request the particular cigar desired.

Figure 5:
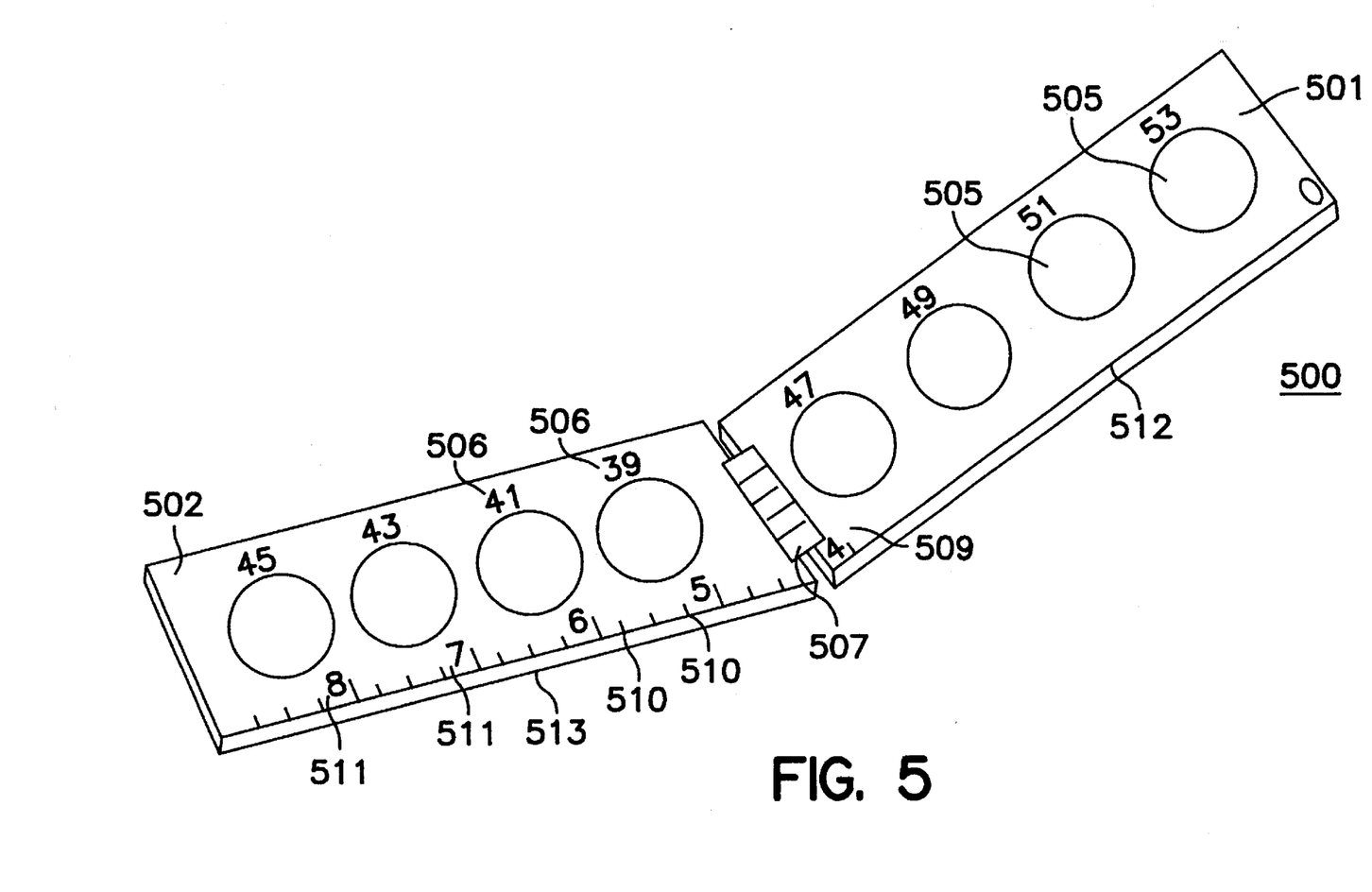
FIG. 5 shows a cigar measuring device in accordance with yet another embodiment of the present invention.

FIG. 5 shows a cigar measuring device 500 in accordance with a still further embodiment of the present invention. The device 500 comprises a first blade 501 and a second blade 502, each blade preferably made from a rigid material, such as metal, wood, plastic, and the like, as described above. The two blades are rotatably joined at one end thereof by a fastening means 507, such as a hinge or the like, where the fastening means 507 has an axis of rotation parallel to the surface of the blades. The device 500 may comprise more than two blades, in which case a third blade would be rotatably joined to the second blade, and so forth.

Each of the blades is provided with plural apertures 505, each aperture 505 having a unique diameter. Each of the blades may be provided with indicia 506 adjacent each aperture 505, whereby each indicium 506 denotes the ring size, or diameter in units of one sixty-fourth (1/64) inch. The indicia 506 may be engraved, embossed, imprinted, or otherwise provided on the blades. In one embodiment, apertures 505 would be provided to correspond to each ring size from about thirty-eight (38) to about fifty-four (54). Alternately, apertures 505 could be provided corresponding only to even ring sizes or corresponding only to odd ring sizes, as shown in FIG. 5, so as to decrease the size of the device 500. Again, the apertures 505 must be drilled approximately one sixty-fourth of an inch larger than the corresponding ring size.

The bottom portion 512 of the first blade 501 is provided with one or more ruled markings 509. The bottom portion 513 of the second blade 502 is provided with ruled markings 510. Such ruled markings may be at 1-inch, ½-inch, ¼-inch, ⅛-inch, or, most preferably, 1/16-inch intervals. One edge of the bottom portion 512 of the first blade 501 may be used as the zero rule 508, or a separate zero rule (not shown) may be provided. The bottom portion 513 of the second blade 502 is preferably further provided with indicia 511 adjacent at least one or more of the ruled markings 510, whereby each indicium indicates the length from the zero point 508 in units of one (1) inch.

To use the measuring device 500, a user would unfold the blades from the stored position, so that the blades are on a flat plane with each other to create a straight rule. The user would then align one end of a cigar with the edge of the first blade 501 and determine the length of the cigar using the ruled markings 510. To determine the diameter or ring size of the cigar, the user then passes the cigar through the apertures 505 to determine the closest fit. As before, with knowledge of the manufacturer, the length, and the ring size of the cigar, the user can enter any tobacco shop and request the particular cigar desired.

It is to be understood that the determination of the length and ring gauge of the cigar can be made in any order. And, of course, the apertures for determining the ring gauge can be chosen to represent any desired sizes and can be arranged in any pattern, on any number of leaves or blades. In the embodiments of FIGS. 1 and 2, the useful number of leaves is from about two (2) to about six (6), with four (4) or five (5) being the optimum number. In the embodiments of FIGS. 4 and 5, the useful number of blades is about two (2) to four (4), with two (2) or three (3) being the optimum number. Moreover, the ruled markings and/or the zero rule may be provided on the apertured leaves and/or on the outer case and/or on separate non-apertured leaves. Thus, for example, when the outer case is not made from a rigid material, the necessary rulings may be provided on the apertured leaves or additional non-apertured leaves may be provided for this purpose.

It is also to be understood that the above-described arrangements are merely illustrative of the many possible embodiments which represent applications of the present invention. Numerous and varied other arrangements can readily be devised in accordance with the principles of the present invention without departing from the spirit and scope thereof.

What is claimed is:

1. A pocket-sized apparatus for determining the length and ring gauge of a cigar comprising an outer case of rigid material, said outer case containing plural leaves of rigid material rotatably mounted on a fastening means, said fastening means having an axis of rotation perpendicular to a front portion of said outer case, whereby each of said plural leaves is rotatable through 180°, each of said plural leaves having at least one aperture therethrough, at least one of said plural leaves further being provided with ruled markings, whereby said at least one of said plural leaves when rotated through 180° forms a straight edge with the front portion of the outer case, and wherein each of said plural leaves is further provided with indicia indicative of ring gauge, wherein each indicium is adjacent a corresponding one of said at least one apertures.

2. An apparatus in accordance with claim 1 wherein said at least one of said plural leaves provided with ruled markings is further provided with indicia indicative of length.

3. An apparatus in accordance with claim 1 wherein the front portion of said outer case is further provided with ruled markings, whereby when said at least one of said plural leaves is rotated through 180°, the front portion of said outer case forms a ruled straight edge with the ruled markings on said at least one of said plural leaves.

4. An apparatus in accordance with claim 1 wherein the front portion of said outer case is further provided with a zero rule, whereby when said at least one of said plural leaves is rotated through 180°, the front portion of said outer case forms a zero point for the ruled markings on said at least one of said plural leaves.

5. An apparatus in accordance with claim 1 wherein said fastening means further includes tension means to retain said plural leaves in a stored position.

6. An apparatus in accordance with claim 1 wherein each of said plural leaves further includes detent means to facilitate rotation of said plural leaves out of a stored position.

7. A pocket-sized apparatus for determining the length and ring gauge of a cigar comprising an outer case having a front portion and a back portion of rigid material, wherein the front and back portions of said outer case are rotatably mounted on a fastening means, said fastening means having an axis of rotation parallel to the front portion of said outer case, said outer case containing plural leaves of rigid material rotably mounted on said fastening means, whereby each of said plural leaves is rotatable through 180°, each of said plural leaves having at least one aperture therethrough, the back portion of said outer case being provided with ruled markings, whereby the back portion of said outer case when rotated through 180° forms a straight edge with the front portion of the outer case, and wherein each of said plural leaves is further provided with indicia indicative of ring gauge, wherein each indicium is adjacent a corresponding one of said at least one apertures.

8. An apparatus in accordance with claim 7 wherein the back portion of said outer case is further provided with indicia indicative of length.

9. An apparatus in accordance with claim 7 wherein the front portion of said outer case is further provided with ruled markings, whereby when the back portion of said outer case is rotated through 180°, the front portion of said outer case forms a ruled straight edge with the ruled markings on the back portion of said outer case.

10. An apparatus in accordance with claim 7 wherein the front portion of said outer case is further provided with a zero rule, whereby when the back portion of said outer case is rotated through 180°, the front portion of said outer case forms a zero point for the ruled markings on the back portion of said outer case.

11. A pocket-sized apparatus for determining the length and ring gauge of a cigar comprising a relatively flat plate of rigid material, said plate having plural apertures therethrough, said plate further being provided with ruled markings along an edge portion thereof, and wherein said plate is further provided with indicia indicative of ring gauge, wherein each indicium is adjacent a corresponding one of said plural apertures.

12. An apparatus in accordance with claim 11 wherein said plate is further provided with indicia indicative of length.

13. An apparatus in accordance with claim 11 wherein the edge portion provided with ruled markings is beveled.

14. A pocket-sized apparatus for determining the length and ring gauge of a cigar comprising plural blades of rigid material, wherein pairs of said plural blades are joined end to end by fastening means, said fastening means having an axis of rotation perpendicular to the surface of the blades, whereby each of said blades is rotatable through 180° so as to form a straight edge, each of said plural blades having at least one aperture therethrough, at least one of said plural blades further being provided with ruled markings, and wherein each of said plural blades is further provided with indicia indicative of ring gauge, wherein each indicium is adjacent a corresponding one of said at least one apertures.

15. An apparatus in accordance with claim 14 wherein said at least one of said plural blades provided with ruled markings is further provided with indicia indicative of length.

16. An apparatus in accordance with claim 14 wherein one of said plural blades is further provided with a zero rule, whereby when said plural blades are rotated through 180° to form a straight edge, the zero rule forms a zero point for the ruled markings on said at least one of said plural blades.

17. A pocket-sized apparatus for determining the length and ring gauge of a cigar comprising plural blades of rigid material, wherein pairs of said plural blades are joined end to end by fastening means, said fastening means having an axis of rotation parallel to the surface of the blades, whereby each of said blades is rotatable through 180° so as to form a straight edge, each of said plural blades having at least one aperture therethrough, at least one of said plural blades further being provided with ruled markings, and wherein each of said plural blades is further provided with indicia indicative of ring gauge, wherein each indicium is adjacent a corresponding one of said at least one apertures.

18. An apparatus in accordance with claim 17 wherein said at least one of said plural blades provided with ruled markings is further provided with indicia indicative of length.

19. An apparatus in accordance with claim 17 wherein one of said plural blades is further provided with a zero rule, whereby when said plural blades are rotated through 180° to form a straight edge, the zero rule forms a zero point for the ruled markings on said at least one of said plural blades.

20. A method for ascertaining the particular type of a cigar comprising the steps of:

determining the manufacturer's name from the cigar band, b. aligning one end of the cigar with a zero point of a ruled straight edge of a pocket-sized measuring apparatus and determining the length thereof, and c. passing the cigar through a series of apertures of said pocket-sized measuring apparatus, said apertures having unique diameters and said apparatus having indicia indicative of ring size adjacent said apertures and determining the ring gauge thereof.

* * * * *